United States Patent
Balaghiasefi et al.

(10) Patent No.: US 10,564,647 B2
(45) Date of Patent: Feb. 18, 2020

(54) METHOD AND APPARATUS FOR DETERMINING A DESIRED TRAJECTORY FOR A VEHICLE

(71) Applicant: VOLKSWAGEN AG, Wolfsburg (DE)

(72) Inventors: Reza Balaghiasefi, Wolfsburg (DE); Michael Düring, Braunschweig (DE); Kai Franke, Stendal (DE)

(73) Assignee: Volkswagen AG (DE)

( * ) Notice: Subject to any disclaimer, the term of this patent is extended or adjusted under 35 U.S.C. 154(b) by 309 days.

(21) Appl. No.: 15/252,259

(22) Filed: Aug. 31, 2016

(65) Prior Publication Data
US 2017/0083021 A1 Mar. 23, 2017

(30) Foreign Application Priority Data

Sep. 17, 2015 (DE) ........................ 10 2015 217 891

(51) Int. Cl.
*G06D 1/02* (2006.01)
*G05D 1/02* (2020.01)

(52) U.S. Cl.
CPC ......... *G05D 1/0289* (2013.01); *G05D 1/0223* (2013.01)

(58) Field of Classification Search
CPC .. G05D 1/0214; G05D 1/0223; G05D 1/0289; B60W 30/095; G08G 1/163; G08G 1/166
USPC .......................................................... 701/41
See application file for complete search history.

(56) References Cited

U.S. PATENT DOCUMENTS

| | | | | |
|---|---|---|---|---|
| 8,466,807 B2* | 6/2013 | Mudalige | ............... | G08G 1/163 340/435 |
| 9,081,387 B2* | 7/2015 | Bretzigheimer | .......... | B60T 1/10 |
| 9,108,600 B2* | 8/2015 | Hartmann | ........... | B60T 8/17558 |

(Continued)

FOREIGN PATENT DOCUMENTS

| | | |
|---|---|---|
| CN | 101395647 A | 3/2009 |
| CN | 101636304 A | 1/2010 |

(Continued)

OTHER PUBLICATIONS

Machine Translation DE-102013225057-A1; Jun. 2011 (Year: 2011).*

(Continued)

*Primary Examiner* — Anne M Antonucci
*Assistant Examiner* — James E Stroud
(74) *Attorney, Agent, or Firm* — Barnes & Thornburg LLP (57) ABSTRACT

A method for automatic determination and/or monitoring of a target trajectory for a vehicle by which a starting point corresponding to the current position of the vehicle is connected to a target point. The method includes determining different trajectories of the vehicle that connect the starting point to the target point, detecting a further target trajectory for each road user, wherein each of the further target trajectories connects the starting point of the respective road user to a target point corresponding to the respective road user, determining the trajectories of the vehicle as collision-free trajectories that do not result in a collision with one of the further road users if the respective road user is moving on the target trajectory, and determining and/or monitoring the target trajectory of the vehicle depending on the collision-free trajectories of the vehicle.

21 Claims, 5 Drawing Sheets

(56) References Cited

U.S. PATENT DOCUMENTS

| | | | |
|---|---|---|---|
| 2003/0014165 A1* | 1/2003 | Baker | G05D 1/104 701/3 |
| 2004/0024527 A1* | 2/2004 | Patera | G08G 5/045 701/301 |
| 2004/0024528 A1* | 2/2004 | Patera | G08G 5/045 701/301 |
| 2010/0114633 A1* | 5/2010 | Sislak | G06Q 10/047 701/120 |
| 2010/0228419 A1 | 9/2010 | Lee et al. | |
| 2011/0307175 A1* | 12/2011 | Gandhi | G08G 1/166 701/301 |
| 2014/0067252 A1* | 3/2014 | Knoop | G08G 1/167 701/400 |
| 2014/0074388 A1 | 3/2014 | Bretzigheimer et al. | |
| 2015/0025660 A1* | 1/2015 | Prassler | A63B 21/0615 700/91 |
| 2015/0284010 A1* | 10/2015 | Beardsley | B60W 50/10 701/41 |
| 2015/0353081 A1* | 12/2015 | Kaminade | G01S 13/931 701/1 |
| 2016/0378117 A1* | 12/2016 | Szatmary | B25J 5/00 382/153 |
| 2017/0083021 A1* | 3/2017 | Balaghiasefi | G05D 1/0214 |
| 2017/0212513 A1* | 7/2017 | Iida | G05D 1/0061 |
| 2017/0354886 A1* | 12/2017 | Sato | A63F 13/56 |

FOREIGN PATENT DOCUMENTS

| | | |
|---|---|---|
| CN | 104755343 A | 7/2015 |
| DE | 102006046697 A1 | 4/2008 |
| DE | 102006047131 A1 | 4/2008 |
| DE | 602005001615 T2 | 4/2008 |
| DE | 102010033776 A1 | 5/2011 |
| DE | 102012203187 A1 | 9/2012 |
| DE | 102012009267 A1 | 12/2012 |
| DE | 102013005362 A1 | 10/2013 |
| DE | 102013202053 A1 | 8/2014 |
| DE | 102013113572 A1 | 2/2015 |
| DE | 102013217486 A1 | 3/2015 |
| DE | 102013225057 A1 | 6/2015 |
| EP | 1717778 A1 | 11/2006 |

OTHER PUBLICATIONS

Search Report for European Patent Application No. 16188586.8; dated Feb. 17, 2017.

Office Action for Chinese Patent Application No. 201610823398.8; dated Sep. 26, 2018.

Search Report for Chinese Patent Application No. 201610823398.8; dated Sep. 26, 2018.

* cited by examiner

METHOD AND APPARATUS FOR DETERMINING A DESIRED TRAJECTORY FOR A VEHICLE

PRIORITY CLAIM

This patent application claims priority to German Patent Application No. 10 2015 217 891.9, filed 17 Sep. 2015, the disclosure of which is incorporated herein by reference in its entirety.

SUMMARY

Illustrative embodiments provide a method and apparatus for determining a target trajectory or a reference trajectory for a vehicle.

BRIEF DESCRIPTION OF THE DRAWINGS

Disclosed embodiments are described in detail below with reference to the drawings.

DETAILED DESCRIPTION

DE 60 2005 001 615 T2 describes the determination of a number of maneuvers that a vehicle can perform and by means of which a collision with an obstacle can be avoided.

DE 10 2012 203 187 A1 discloses the construction of a trajectory of motion or a set of trajectories of motion, wherein the predicted trajectory of motion is continuously monitored during the driving maneuver and is adapted if required owing to a dynamically changing driving situation. If this is not possible, the trajectory of motion is discarded and predicted again.

DE 10 2013 217 486 A1 describes a search in an occupancy grid for occupied grid cells that bound a free space.

Upcoming safety systems for vehicles determine the reaction thereof not only using an egocentric situation analysis, but using a cooperative agreement with other road users. In this case the cooperative agreement with other road users means that in conflict situations the respective involved road users identify, decide and implement common resolution strategies to achieve an improved result overall for all road users.

The cooperative agreement is mainly implemented by a complex system of perception, interpretation, analysis, decision and performance, wherein the actions are distributed to different agents. The cooperative agreement comprises the calculation of a complex maneuver plan while taking into account an existing environment model and a prediction of the behavior of the road users involved.

Disclosed embodiments better take into account the behavior of the involved road users when determining and/or monitoring a target trajectory for a vehicle than is the case according to the prior art.

Disclosed embodiments provide a method for automatically determining and/or monitoring a target trajectory for a vehicle, a device, and a vehicle.

Disclosed embodiments provide a method for automatically determining and/or monitoring a target trajectory for a vehicle is provided. In this case, a target trajectory connects a starting point, which corresponds to the current position of the vehicle during the first or initial determination of the target trajectory, to a safe target point. The target trajectory practically predetermines a path for the vehicle on which the vehicle is to move from the starting point to the target point (in particular, automatically). The disclosed method comprises the following operations:

Determining different (in particular, all drivable) trajectories of the vehicle that connect the starting point to the target point. The determination of the finite set of drivable trajectories of the vehicle practically forms the basis for determining the target trajectory that corresponds to the most suitable trajectory from the set.

Detecting at least one further target trajectory for each involved road user. In this case, each of the further target trajectories connects the starting point or the current position of the respective road user to a safe target point associated with the respective road user. For this an involved road user means a road user that could potentially collide with the vehicle if the vehicle is moving along one of the determined trajectories. In this case, the detection of the (further) target trajectory of an involved road user can also include the detection of a change of the (further) target trajectory of the involved road user, so that the change of the target trajectory can be taken into account when determining and/or monitoring the target trajectory of the vehicle. The target trajectory of the respective further road user can be transmitted from the respective road user to the vehicle, for example, by Car2Car communications.

Determining collision-free trajectories from the previously determined set of trajectories. For this a trajectory is considered to be collision-free if the vehicle will not collide with one of the further road users if the vehicle is moving along the trajectory and if at the same time the respective road user is moving on (at least one) target trajectory thereof.

Determining and/or monitoring the target trajectory of the vehicle depending on the collision-free trajectories of the vehicle. For this, determining and/or monitoring the target trajectory also means that a check is made as to whether a once predetermined or determined target trajectory of the vehicle can be maintained. The target trajectory of the vehicle can be maintained if it is still one of the collision-free trajectories of the vehicle.

By taking into account the further target trajectories of the involved road users when determining and/or monitoring the target trajectory of the vehicle, determining and/or monitoring the target trajectory of the vehicle is improved. Because changes of the plan of the involved road users, which are detected as the change of the (further) target trajectories of the road users, can also be taken into account, a response to the current situation can be made at any time.

An occupancy map is determined for this that indicates whether one of the road users is in a certain grid cell of a grid map of a lane on which the vehicle is moving at a certain point in time. The determination of the collision-free trajectories can be carried out depending on the occupancy map. In doing so, static as well as dynamic obstacles are also considered as road users. The occupancy map is continuously updated and describes the surroundings of the vehicle, in particular, as a binary variable. During this the existence of an obstacle in a certain grid cell is considered to be a 1 (as the value for the grid cell), whereas a grid cell that contains no obstacle at the respective point in time is given the value 0.

Practically, the basis of the occupancy map is the grid map that divides the segment of lane to be traveled by the vehicle into segments, in particular, squares or rectangles of equal size, to describe the geometry of the lane. It is assumed for this that the vehicle and the involved road user are moving in a two-dimensional environment (i.e., not perpendicular to the lane). The lane or the surroundings is/are therefore represented as a number of cells, each of which has a certain length and a certain width. In this case the size of the cells can be freely selected.

A state space for the vehicle is also determined by determining the minimum and the maximum per grid cell for one or a plurality of properties of points of the trajectory that lie within the respective grid cell, based on the previously determined trajectories of the vehicle. The determination and/or monitoring of the target trajectory of the vehicle is then carried out depending on the state space.

The state space is therefore a space that is described by all possible configurations. For this a configuration means the detailed description of a state of the vehicle, for example, the speed thereof or the orientation thereof. The state space can also be considered as a combination of the grid map with the set of previously determined trajectories of the vehicle. The calculated set of trajectories for this describes all possible actions or courses of action for the vehicle to arrive at the safe target point within a predefined timescale or time interval from the starting point. Each trajectory can be defined for this as a number of points $p_i=(u, x, y, v, h, t)$. In this case u defines the trajectory to which the respective point belongs, x or y defines a coordinate of the respective point, v defines the speed of the vehicle at the respective point when traversing the trajectory u, h defines the orientation of the vehicle at the respective point when traversing the trajectory u and t defines the point in time at which the vehicle is at the respective point when it is traversing the trajectory u. The set of points within a certain cell determines the properties in the cell.

In Table 1 the properties of the points that belong to a trajectory that crosses the corresponding grid cell are listed.

TABLE 1

| u | v [m/s] | ψ [°] | t [s] |
|---|---|---|---|
| 122 | 20.00 | 5.02 | 2.21 |
| 122 | 20.05 | 5.01 | 2.22 |
| 122 | 20.10 | 5.00 | 2.23 |
| ... | ... | ... | ... |
| 135 | 21.40 | 10.00 | 2.03 |
| ... | ... | ... | ... |
| 135 | 21.95 | 9.17 | 2.22 |
| 135 | 22.00 | 9.16 | 2.23 |

Such a table can be constructed for each grid cell. Using such a table, the maximum value and the minimum value for the respective grid cell can be determined for each grid cell and for each property. The multidimensional maximum and minimum values therefore describe the limitations on the permissible actions of the vehicle within the respective grid cell. The state space thus indicates which deviations or which properties are allowed in each configuration space or in each grid cell, so that the safe end state or the safe end point of the target trajectory of the vehicle can still always be reached.

Based on the collision-free trajectories of the vehicle, the minimum and the maximum of one or all of the properties of the points of the collision-free trajectories that cross the respective grid cell can be determined for each grid cell. Depending on the minimum and maximum, the target trajectory of the vehicle can then be determined and/or monitored.

In other words, a common state space for the vehicle is determined by combining the occupancy map and the state space for the vehicle on the one hand and on the other hand by taking into account the movements of dynamic obstacles or road users using the target trajectories thereof or reference trajectories and also static obstacles. As a result, all collision-prone trajectories from the set of all drivable trajectories of the vehicle are determined by carrying out a collision test of all drivable trajectories of the vehicle while taking into account all obstacles (dynamic and static). The collision-free trajectories are thus revealed by the difference of the set of all drivable trajectories of the vehicle minus the collision-prone trajectories of the vehicle. The collision-free trajectories describe the still existing or possible actions or courses of action of the vehicle. The collision-free trajectories thereby determine new boundary conditions for each grid cell.

Depending on the minimum and the maximum of the at least one property, a degree of freedom per grid cell can be determined. The target trajectory of the vehicle can then be determined and/or monitored depending on the degree of freedom.

The degree of freedom $f_{ci,j}$ of a certain cell $c_{i,j}$ can be calculated by the following equation (1):

$$f_{ci,j}=\alpha(\Delta V_{ci,j}/v)+\beta(\Delta \Psi_{ci,j}/\psi)+\gamma(\Delta T_{ci,j}/t) \quad (1).$$

In this case, α, β and γ are constants. $\Delta V_{ci,j}$ corresponds to a difference of the maximum speed and the minimum speed within the cell $c_{i,j}$. $\Delta \Psi_{ci,j}$ is a difference of the maximum orientation and the minimum orientation of the vehicle within the cell $c_{i,j}$. $\Delta T_{ci,j}$ is a difference of the maximum time (i.e., of the point of a collision-free trajectory with the largest time separation from a point in time t=0) and the minimum time (i.e., of the point of a collision-free trajectory with the smallest time difference from the point in time t=0) within the cell $c_{i,j}$, and v, ψ and t are normalization functions to be able to add the differences of different units.

The degree of freedom at a first point in time (t=0) and at a later second point in time is determined. For this, as a rule the point in time at which the vehicle is at the starting point and begins to travel along the target trajectory corresponds to the first point in time. The target trajectory of the vehicle is determined and/or monitored depending on a comparison between the degree of freedom that is determined at the second point in time and at least one threshold value that is determined depending on the degree of freedom that is determined at the first point in time.

In other words, the degree of freedom per cell at the second point in time is compared with the degree of freedom per cell at the first point in time. During this, changes in the surroundings or changes in the plans of road users have been taken into account during the calculation of the degree of freedom at the second point in time. If the degree of freedom at the second point in time has deteriorated too much in comparison with the degree of freedom at the first point in time, the target trajectory of the vehicle should either be suitably adjusted or completely re-determined.

For example, a first threshold value is determined depending on the degree of freedom at the first point in time and a second threshold value is determined depending on the degree of freedom at the first point in time, wherein the second threshold value is smaller than the first threshold value and wherein it is assumed that the degree of freedom is greater, the more possibilities there are for the vehicle to be within the respective grid cell. In this case the target trajectory of the vehicle that was calculated at the first point in time can be maintained if the degree of freedom calculated at the second point in time is greater than the first threshold value. The target trajectory of the vehicle is adjusted or newly determined if the degree of freedom calculated at the second point in time is smaller than the first threshold value but greater than the second threshold value. The determination and/or monitoring of the target trajectory is terminated if the degree of freedom calculated at the second point in time is smaller than the second threshold value. In this case, the determination of the target trajectory can be completely re-started.

Optionally, only the degrees of freedom of those grid cells through which the current target trajectory passes or through which the vehicle has yet to travel during its journey on the target trajectory are used for determining and/or monitoring the target trajectory. For example, the determination and/or monitoring of the target trajectory can be carried out in each case at the first and at the second point in time using the degrees of freedom of the grid cells through which the target trajectory passes and through which the vehicle has currently not yet traveled. It is also possible to only take into account the degree of freedom of the grid cell in which the vehicle is currently present for the determination and/or monitoring of the target trajectory. The sums described below include in this case only a summand or correspond to the degree of freedom of the grid cell at the point in time t=0 or t1.

For example, the sum of the degrees of freedom of the grid cells through which the target trajectory passes and through which the vehicle is not yet currently traveling can each be calculated at the first and at the second point in time. The first and the second threshold values can be produced (for example, as a corresponding percentage of the sum) depending on the sum of the degrees of freedom at the first point in time. If the sum of the degrees of freedom at the second point in time is greater than the first threshold value, the target trajectory is not altered. The target trajectory of the vehicle can however be altered (for example, by selecting a better trajectory from the previously determined set of drivable trajectories), if the sum of the degrees of freedom at the second point in time is smaller than the first threshold value but greater than the second threshold value. If by contrast the sum of the degrees of freedom at the second point in time is less than the second threshold value, the determination and/or monitoring of the target trajectory is terminated and completely started again by, for example, generating the set of all possible drivable trajectories again based on the currently applicable boundary conditions to determine the most suitable target trajectory of the vehicle from the set.

According to at least one disclosed embodiment, the set of all possible drivable trajectories of the vehicle is determined such that each trajectory of the set fulfills predetermined physical, infrastructure and/or legal requirements.

For this the physical requirements mean certain conditions that are to be met. For example, maintaining the "circle of forces" condition is a prerequisite as well as taking into account dead times of the brakes or actuator system or steering transmission and gearbox, the rate of change of the steering angle or maximum accelerations or decelerations of the vehicle for a drivable trajectory. Infrastructure and legal requirements correspond, for example, to a maximum speed to be complied with as well as a safety distance to be maintained from another road user.

In summary, the target trajectory for the vehicle is predetermined and it is determined or monitored whether the predetermined target trajectory can be maintained depending on the collision-free trajectories, which are determined over the common state space.

Disclosed embodiments provide a device for determining and/or monitoring a target trajectory of a vehicle is also provided. For this a starting point that corresponds to the current position of the vehicle is connected to a safe target point by the target trajectory. The device comprises detection means and processor means. The detection means are configured to detect at least one further target trajectory of road users in each case. In this case each (further) target trajectory connects the starting point or the current position of the respective road user to a target point corresponding to the respective road user. The processor means are configured to determine a plurality of trajectories (at best all drivable trajectories) of the vehicle that connect the starting point to the target point. Based on the trajectories of the vehicle, those trajectories are classified as collision-free that do not result in a collision with one of the further road users. The processor means are further configured to determine and/or to monitor the target trajectory of the vehicle depending on the collision-free trajectories of the vehicle.

The benefits of the disclosed device correspond essentially to the benefits of the disclosed method, which have been explained in detail above, so that a repetition is omitted here.

Disclosed embodiments provide a vehicle comprises a disclosed device.

The disclosed embodiments are suitable for motor vehicles. Of course, the disclosed embodiments are not limited to vehicles, because the disclosed embodiments can also be used with ships, aircraft as well as railway or track-guided vehicles.

Figure 1:
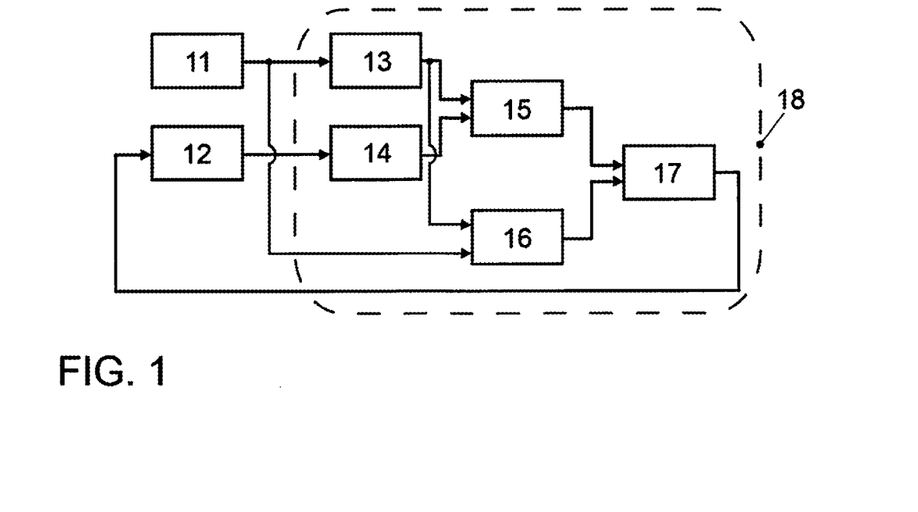
FIG. 1 shows certain components for monitoring the target trajectory of a vehicle.

In FIG. 1 a monitoring process 18 is represented, which comprises a grid map generator 13, a trajectory generator 14, a state space generator 15, an occupancy map generator 16 and a generator 17 for the common state space. The monitoring process 18 works as follows:

In a first operation, a grid map is generated by the grid map generator 13 as a quantized representation of the environment or of an environmental model 11. Then the trajectory generator 14 calculates the set of drivable trajectories that connect the starting point and a safe end point for the vehicle under consideration. For this the trajectory generator 14 obtains the current target trajectory of the vehicle from the maneuver plan 12, using which the trajectory generator 14 can extract the starting point and the end point. The state space generator 15 generates the state space for the vehicle based on the calculated set of trajectories and the grid map. The occupancy map generator 16 calculates an occupancy map from the environmental model 11 that represents the obstacles in the surroundings of the vehicle. The occupancy map is continuously updated. Finally, the generator 17 derives the common state space from the state space and the occupancy map. In doing so, the generator 17 carries out a collision check during each update of the occupancy map or for each change of the target trajectories or reference trajectories of involved road users to determine the collision-free trajectories of the vehicle from all drivable trajectories. Therefore, the common state space describes the current properties of the respective grid cells at each time operation.

Whereas as a rule the generators 13-15 only operate once at the start (if the vehicle is at the starting point of the target trajectory thereof) to generate the grid map, all drivable trajectories and the state space, the generators 16 and 17 operate for each change of inputs that could alter the occupancy map or the common state space. The monitoring algorithm 18 assesses or monitors the target trajectory of the vehicle in each case for the updated common state space at each time operation within the defined maneuver duration (the time period in which the vehicle is moving along the target trajectory thereof). If using the calculation of the degree of freedom the monitoring process or the monitoring algorithm 18 detects that the target trajectory of the vehicle has to be adjusted or completely newly determined, this is notified to the maneuver plan 12.

Using FIG. 2, the calculation of the degree of freedom and the determination and/or monitoring of the target trajectory for a vehicle will be described by way of example.

Figure 2:
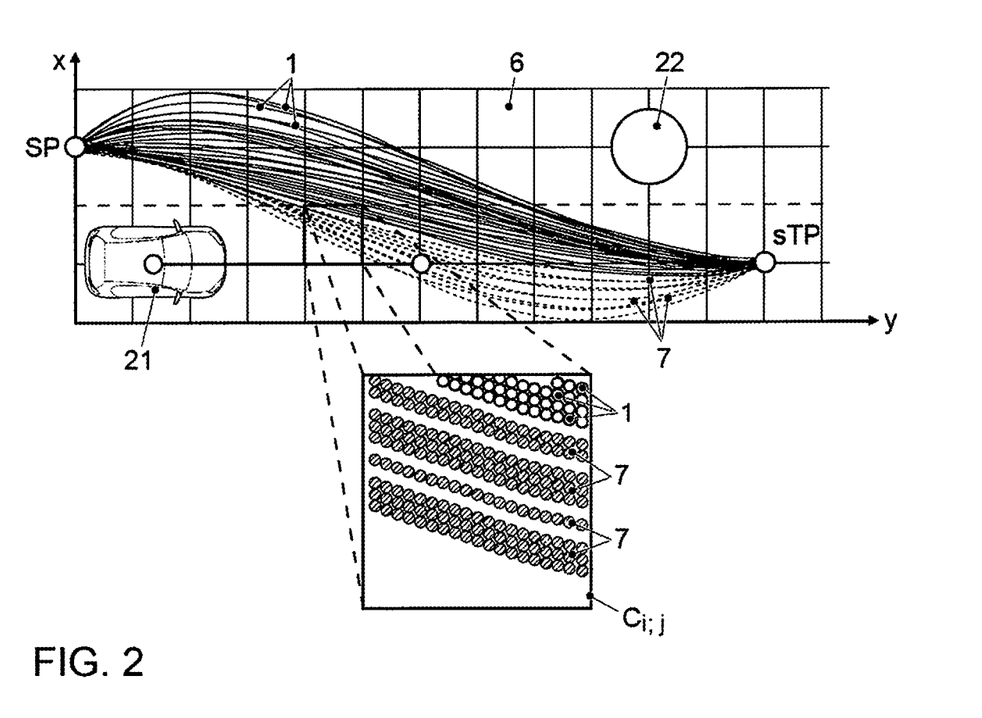
FIG. 2 shows the difference between collision-prone and collision-free trajectories.

With the situation represented in FIG. 2, the vehicle or ego-vehicle starts at the starting point SP and seeks to reach the safe target point sTP on the other lane to avoid a collision with the obstacle 22. Besides the vehicle, a further vehicle 21 is traveling on the other lane, which thereby limits the possible solutions (trajectories) for the vehicle for reaching the target point sTP. In FIG. 2, all possible drivable trajectories of the vehicle from the starting point SP to the target point sTP are represented. In doing so a distinction is made between the collision-free trajectories 1, which in FIG. 2 are represented higher up, and the collision-prone trajectories 7. If the vehicle were driving along one of the collision-prone trajectories 7, it would come into collision with the further vehicle 21 according to the current assumptions regarding the further vehicle 21. The points of those trajectories that pass through a grid cell ci,j are represented in detail in FIG. 2 by way of example.

TABLE 2

| u | v [m/s] | ψ [°] | t [s] |
|---|---------|-------|-------|
| 122 | 20.00 | 5.02 | 2.21 |
| 122 | 20.05 | 5.01 | 2.22 |
| 122 | 20.10 | 5.00 | 2.23 |
| ... | ... | ... | ... |
| ~~135~~ | ~~21.40~~ | ~~10.00~~ | ~~2.03~~ |
| ... | ... | ... | ... |
| ~~135~~ | ~~21.95~~ | ~~9.17~~ | ~~2.22~~ |
| ~~135~~ | ~~22.00~~ | ~~9.16~~ | ~~2.23~~ |

Table 2 is practically an update of Table 1 above, wherein in Table 2 the current trajectories classified as collision-prone are marked or struck through. Based on Table 2, a new minimum and a new maximum can now be determined for the properties v, ψ and t, whereby a new or updated degree of freedom can be calculated. This procedure can be performed for all grid cells or at least for those grid cells through which a trajectory passes.

Figure 3:
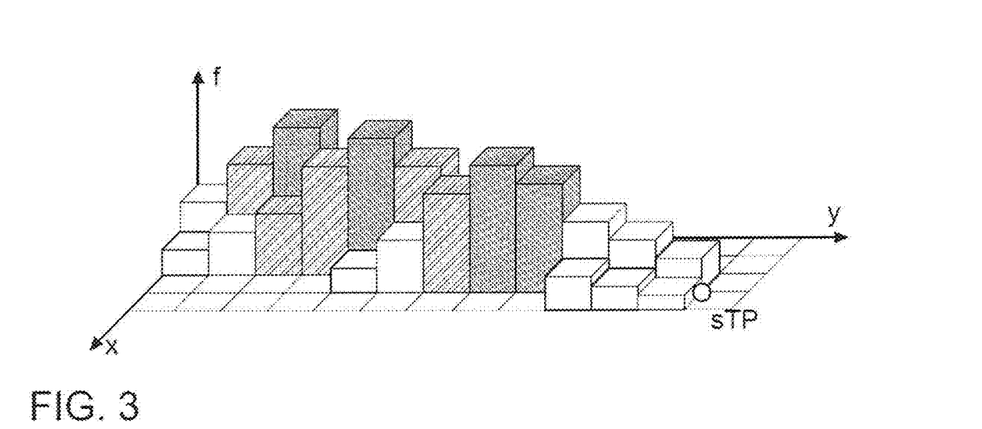
FIG. 3 graphically shows the degrees of freedom for different cells.

The distribution of the degree of freedom f over the grid cells for the vehicle at the start of the maneuver (i.e., the vehicle is at the starting point) at the point in time t=0 is represented in FIG. 3.

In a similar way, any change in the requirements (for example, a change of the target trajectories of the further vehicle 21 or a change in the environmental model) can alter the maximum value or minimum value of the properties of the respective grid cell and thereby the degree of freedom for the vehicle. Using the change of the degree of freedom, any change, for example, in the position or in the dimensions of static obstacles or in the reference trajectories of the involved road user can be taken into account and assessed.

Thus if that vehicle is within a grid cell ui,j at a point in time t (>0), a check can be made as to whether the current degree of freedom fui,j(t) of the grid cell has changed compared to the degree of freedom of the grid cell fui,j(t=0) at the point in time t=0. A check can be made as to whether the sum of the current degrees of freedom of those grid cells through which the vehicle has yet to pass on its journey along the target trajectory differs from the sum of the degrees of freedom of the grid cells at the point in time t=0. If this is the case, there are two possibilities:

The current degree of freedom (the sum of the current degrees of freedom) is greater than the degree of freedom (the sum of the degrees of freedom) at the start of the maneuver. This case, which, for example, can occur if the further vehicle 21 in FIG. 2 is traveling slower than planned or further to the right than planned, is non-critical because the courses of action for the ego-vehicle have even increased.

The current degree of freedom (the sum of the current degrees of freedom) is smaller than the degree of freedom (the sum of the degrees of freedom) at the start of the maneuver. The usual case is to be assessed as critical because the courses of action for the ego-vehicle have reduced. In this a choice has to be made between the following responses:

The current plan can be continued or the current target trajectory of the vehicle can be maintained, or The current plan can be adjusted or the current target trajectory of the vehicle can be altered, by, for example, selecting a better trajectory from the previously determined set of drivable trajectories, or the current plan is terminated because the boundary conditions or courses of action for the ego-vehicle have drastically reduced. In this case the determination of the target trajectory is, for example, completely restarted by, for example, determining a starting point based on the current position of the vehicle and determining a new safe target point based on the current boundary conditions to determine the set of drivable trajectories and a new target trajectory based thereon.

The decision regarding which of the three possible responses is selected is based on the following two threshold values $\zeta_{Cont}$ for plan continuation, and $\zeta_{Can}$ for plan termination.

In this case the current plan is continued or the current target trajectory of the vehicle is maintained if the following equation (2) is fulfilled.

$$\zeta_{Cont}(\text{sum}(f_{ui,j}(t=0))) \leq \text{sum}(f_{ui,j}(t)) \qquad (2)$$

the current plan is adjusted or the current target trajectory of the vehicle is altered if the following equation (3) is fulfilled.

$$\zeta_{Can}(\text{sum}(f_{ui,j}(t=0))) \leq \text{sum}(f_{ui,j}(t)) \leq \zeta_{Cont}(\text{sum}(f_{ui,j}(t=0))) \qquad (3)$$

the current plan is terminated if the following equation (4) is fulfilled.

$$\text{sum}(f_{ui,j}(t)) < \zeta_{Can}(\text{sum}(f_{ui,j}(t=0))) \qquad (4)$$

The two threshold values, with which the sum of the current degrees of freedom of the grid cells through which the vehicle has yet to travel on the journey thereof along the target trajectory is compared, are also dependent on the sum of the degrees of freedom of the grid cell at the point in time t=0.

Disclosed embodiments are described below using a specific example.

TABLE 3

| Parameter | Ego-vehicle | Vehicle 21 | Obstacle 22 |
|---|---|---|---|
| center position (x, y) | (0; 1.87) | (0; −1.87) | (30; 1.87) |
| length/width [m] | 3.8/1.8 | 3.8/1.8 | 3.8/1.8 |
| speed [m/s] | 25 | 15 | 0 |
| sTP (x; y) | (75; −1.87) | (27, −1.87) | (30, 1.87) |
| sTP (v; ψ; t) | (25, 0, 3) | (3, 0, 3) | (0, 0, 3) |

Table 3 gives some information of the ego-vehicle, of the other road user 21 and of the obstacle 22. Besides the current speed of the road user (i.e., point in time t=0) given in the fourth row, in the penultimate row the position of the safe end point of the respective road user and in the last row further properties of the respective road user at the safe end point sTP can be obtained. Because the safe end point of each road user is achieved after 3 s according to the last line, the so-called maneuver duration is 3 s.

Figure 4:
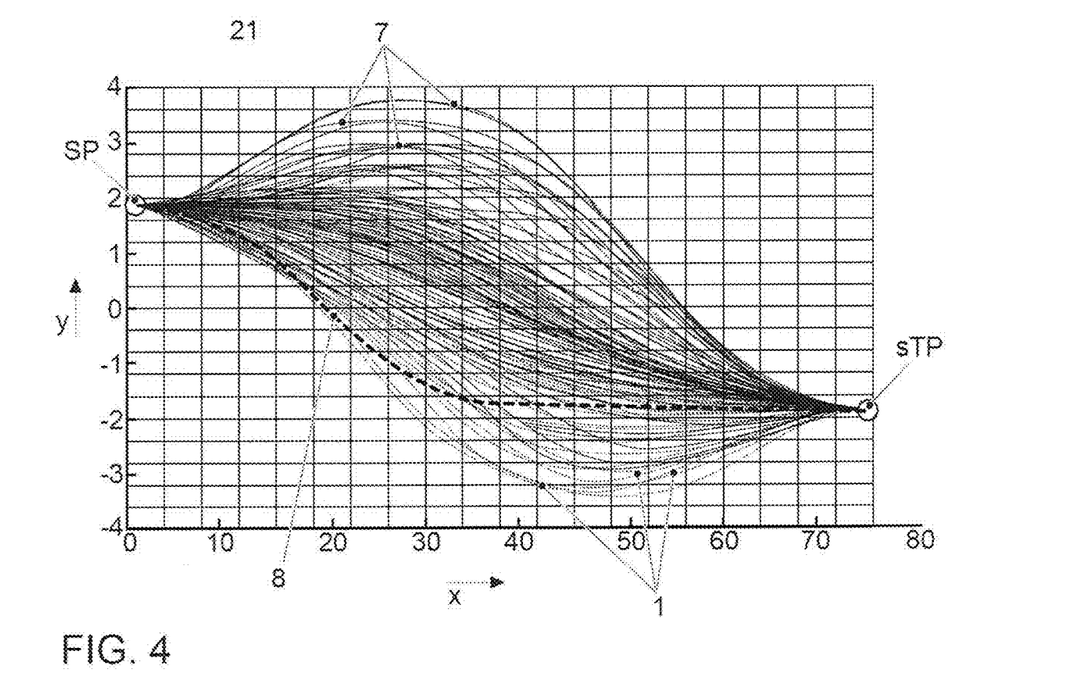
FIG. 4 shows a target trajectory together with collision-free and collision-prone trajectories.

In FIG. 4 all drivable trajectories 1, 7 of the ego-vehicle are represented, wherein a distinction is made between collision-prone trajectories 7 and collision-free trajectories 1. In addition, in FIG. 4 the target trajectory 8 of the ego-vehicle is shown. The division into collision-prone trajectories 7 and collision-free trajectories 1 as well as the determination of the target trajectory 8 are carried out depending on the features of the further road users (vehicle 21 and obstacle 22) given in Table 3. The features or properties of the other road users 21, 22 are either determined depending on data that are detected by sensors of the ego-vehicle or received by means of radio equipment of the ego-vehicle if, for example, the vehicle 21 transmits the target trajectory thereof by radio (Car2Car communications).

Figure 5:
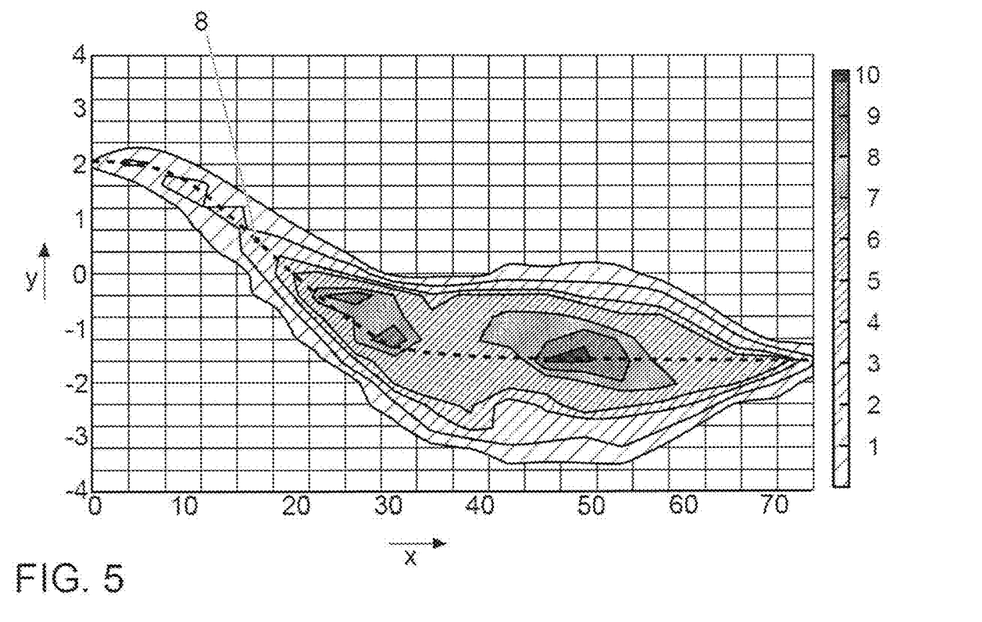
FIG. 5 shows the degrees of freedom of the grid cells together with the target trajectory.
Figure 6:
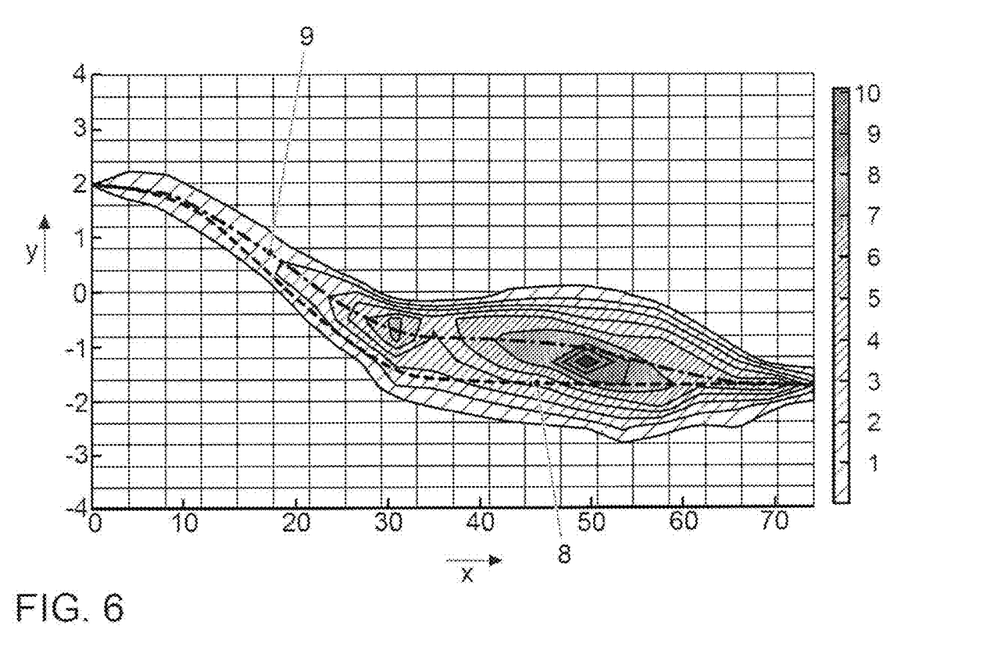
FIG. 6 shows the degrees of freedom of the grid cells following changes of the boundary conditions together with the previous target trajectory and the current target trajectory.

The grid map comprises 20×20 grid cells in FIG. 4 or in the following FIGS. 5 and 6, each corresponding to a length of 3.75 m and a width of 0.4 m in the real environment. The total set of drivable trajectories between the starting point SP and the safe target point sTP is 4050. The trajectories meet the kinematic, dynamic and time requirements, wherein the time requirements mean that the ego-vehicle requires a time of 3 s when traveling along an arbitrary drivable trajectory. The common state space represented in FIG. 4 is generated based on the state space of the ego-vehicle by classifying as collision-prone trajectories 7 all trajectories which would result in a collision with static obstacles (in this example with the obstacle 22) using a collision test. Moreover, the target trajectories of the dynamic obstacles (in this case of the vehicle 21) as an occupancy map are taken into account. In the illustrated example, 3091 trajectories are collision-prone and the remaining 959 trajectories 1 are collision-free. The collision-free trajectories 1 define the scope of possible actions for reaching the safe end point sTP with the ego-vehicle. Based on the thus calculated common state space, the degree of freedom $f_{i,j}$ for each individual grid cell $c_{i,j}$ can be calculated. The distribution of the degrees of freedom over the grid cells for the ego-vehicle at the start of the driving maneuver (t=0) is represented in FIG. 5. It can be seen that the target trajectory 8 passes through grid cells that have a relatively high degree of freedom. For example, the target trajectory can correspond to those collision-free trajectories that have the smallest sum of the degrees of freedom if the degrees of freedom of those grid cells through which the respective trajectory passes are summed.

Figure 8:
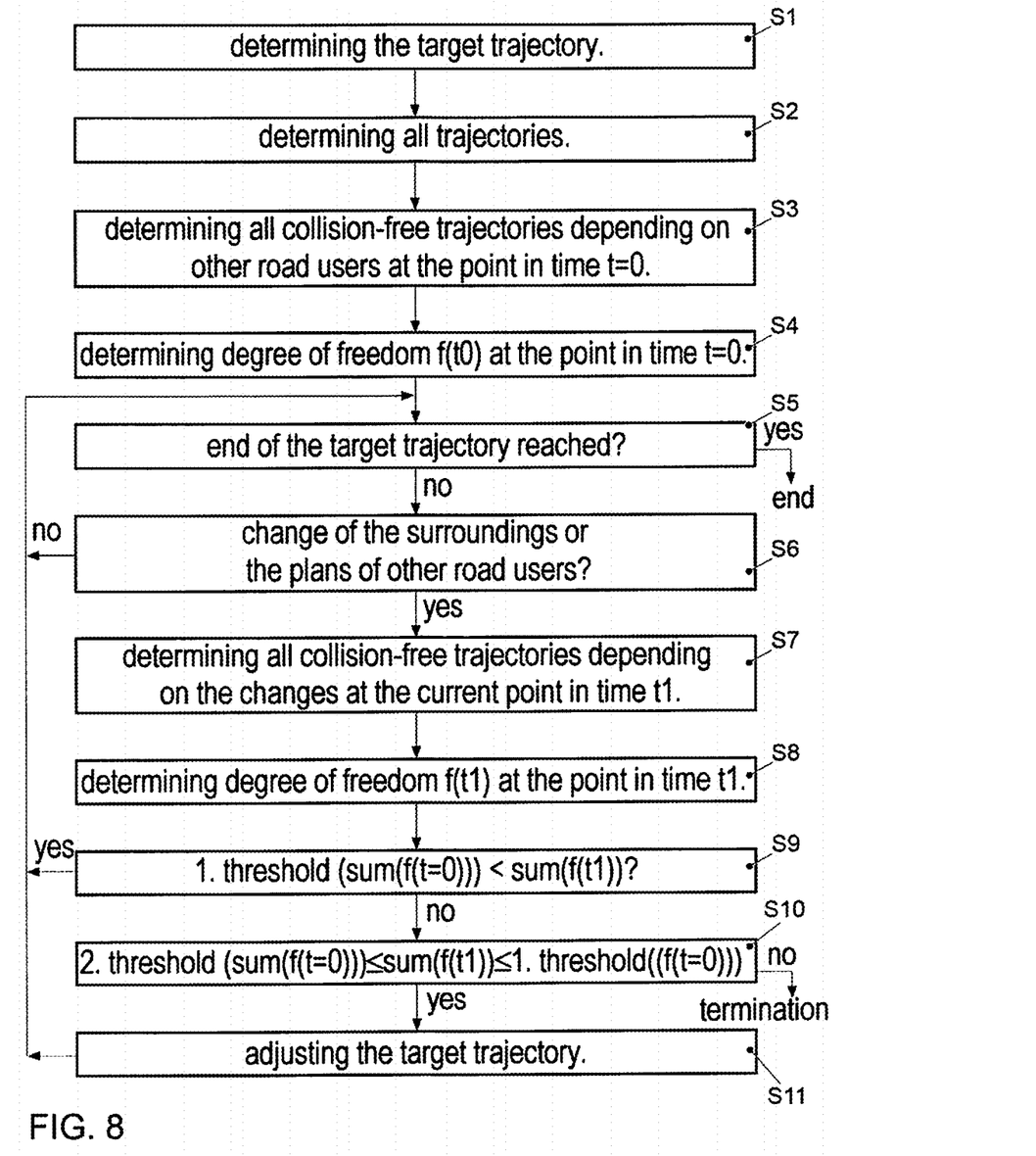
FIG. 8 shows a flow chart of a disclosed method.

With the further procedure, the degrees of freedom at the point in time t=0 are compared with the degrees of freedom at the respective current point in time. For this at the respective point in time the degrees of freedom of those grid cells through which the target trajectory 8 passes (or better through which the vehicle has yet to pass on its journey along the target trajectory), are summed up to a sum that is then compared with a total output. For calculation of the total output, the degrees of freedom of those grid cells through which the target trajectory 8 passes (or better, through which the vehicle must yet pass on its journey along the target trajectory), are summed up at the point in time t=0. The determination and/or monitoring of the target trajectory of the vehicle is/are carried out depending on the two threshold values ζCont and ζCan that have already been described above, which are calculated depending on the total output. In the example shown, the threshold value ζCont is ⅔ of the total output and the threshold value ζCont is ⅓ of the total output.

It is assumed that the vehicle 21 does not behave cooperatively, in contrast to the assumption forming the basis for the calculation of the common state space shown in FIG. 4. According to the original assumption it was provided that the vehicle 21 reduces the initial speed thereof from 15 m/s to 3 m/s. The disclosed method now detects that instead of this the vehicle is maintaining the initial speed thereof of 15 m/s. At the point in time t=0.3 s the common state space shown in FIG. 6 results. It is detected that the degrees of freedom of the grid cells through which the target trajectory 8 passes have greatly deteriorated in comparison to FIG. 5. Whereas the average initial degree of freedom (the sum of the degrees of freedom at the point in time t=0 divided by the number of grid cells forming the sum) was calculated as 2.88, the current average degree of freedom of the grid cells through which the target trajectory 8 passes at the point in time t=0.3 s is still only 1.87. Thereby the current average degree of freedom is less than ⅔ of the average initial degree of freedom (⅔*2.88=1.92), but always still greater than ⅓ of the average initial degree of freedom (⅓*2.88=0.96). Therefore, a plan adjustment is carried out, which results in the new target trajectory for the ego-vehicle shown in FIG. 6. It is detected that the new target trajectory 9 in comparison to the old target trajectory 8 runs further up to avoid a collision with the vehicle 21.

Figure 7:
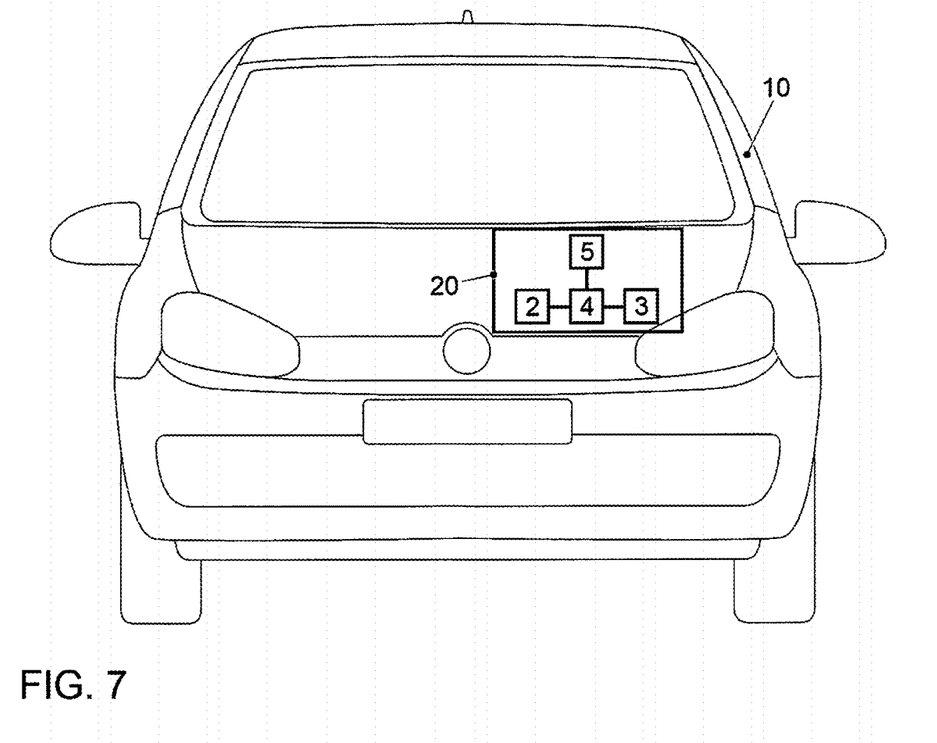
FIG. 7 shows a disclosed vehicle with a disclosed device.

In FIG. 7, a vehicle 10 with a device 20 is represented schematically. In this case, besides a controller 4 the device 20 comprises a LIDAR sensor 2, a camera 3 and a communications device 5. Using the sensor 2 and the camera 3, the surroundings of the ego-vehicle 10 are recorded. Information about plans (for example, planned target trajectories) of further vehicles that can influence the planning and the checking of the target trajectory of the ego-vehicle 10 can also be received by the ego-vehicle 10 by means of the communications device 5, for example, using Car2Car communications.

In FIG. 8, a disclosed embodiment of the disclosed method is represented as a flow chart.

In operation at S1 a target trajectory of the ego-vehicle is determined, whereas in operation at S2 all possible drivable trajectories for the ego-vehicle to pass from the starting point to the safe target point are determined. In operation at S3, the collision-free trajectories at the point in time t=0 are determined from the finite set of all trajectories that are determined in operation at S2, wherein other road users (for example, other vehicles or obstacles) that could result in a collision with the ego-vehicle are taken into account. Based on the collision-free trajectories, at least the degrees of freedom in the grid cells that comprise at least one point of the target trajectory are determined. The degrees of freedom of the grid cells that comprise at least one point of the target trajectory are summed up to a total output to determine a basis of comparison for the following points in time.

If the query S5 is answered with a yes, the ego-vehicle has reached the end of the target trajectory (i.e., the safe target point) and the process ends. If by contrast the query S5 is answered with a no, a check is made in the following query S6 as to whether changes in the surroundings of the ego-vehicle or in the plans of the other road users have occurred. If this is not the case, the method jumps back to query S5. If by contrast this is the case, depending on the changes the collision-free trajectories at the current point in time t1 are determined based on the set of trajectories determined in operation at S2. For this, based on the trajectories determined in operation at S2, all those trajectories are determined that are collision-prone depending on the current plans of the other road users (including the obstacles), whereby the collision-free trajectories are also determined (indirectly). Using the collision-free trajectories determined in operation at S7, the degree of freedom is in turn determined at least for those grid cells through which the target trajectory of the ego-vehicle passes. As a result, the sum of the degrees of freedom of the grid cells through which the target trajectory passes at the point in time t1 can be determined in operation at S8.

In operation at S9, based on the total output a first threshold value is calculated that is compared with the sum of the degrees of freedom of the grid cells through which the target trajectory passes at the point in time t1. For example, the first threshold value can be a certain percentage (for example, between 50% and 90%) of the total output. If the first threshold value is less than the sum of the degrees of freedom of the grid cells through which the target trajectory passes at the point in time t1, the current plan can be followed (i.e., the target trajectory remains unchanged) and the method jumps back to operation at S5. If by contrast the sum of the degrees of freedom of the grid cells through which the target trajectory passes at the point in time t1 is less than or equal to the first threshold value, in the following operation at S10 a second threshold value is calculated based on the total output. The second threshold value can also be a certain percentage (for example, between 20% and 50%) of the total output. If the sum of the degrees of freedom of the grid cells through which the target trajectory passes at the point in time t1 is less than or equal to the first threshold value but greater than or equal to the second threshold value, the target trajectory is adjusted or amended in operation at S11. The change can, for example, be carried out using the current degrees of freedom of all grid cells. If by contrast the sum of the degrees of freedom of the grid cells through which the target trajectory passes at the point in time t1 is also less than the second threshold value, the disclosed method terminates because a new plan (i.e., a new target trajectory) is to be generated because the boundary conditions that applied for generating the original target trajectory (at the point in time t=0) have changed too much. In this case, a new target trajectory can be determined based on the current position of the ego-vehicle and on the current knowledge of the surroundings (for example, the positions of obstacles, target trajectories of surrounding road users), so that the disclosed method is practically re-started at operation at S1.

REFERENCE CHARACTER LIST 1 collision-free trajectory
2 LIDAR sensor
3 camera
4 controller
5 communications device
6 lane
7 collision-prone trajectories
8,9 target trajectory or reference trajectory
10 vehicle
11 environmental model
12 maneuver planning
13 grid map generator
14 trajectory generator
15 state space generator
16 occupancy map generator
17 generator of the common state space
18 monitoring process
20 device
21 vehicle
22 obstacle
$c_{i,j}$ grid cell
f degree of freedom
SP starting point
sTP safe target point

The invention claimed is:

1. A method for automatically determining, in a transportation vehicle, and, thereafter, monitoring a need to re-determine a current target trajectory for the transportation vehicle, wherein target trajectories connect a transportation vehicle starting point that corresponds to a current position of the transportation vehicle to a target point for the transportation vehicle, the method comprising: determining, using a processor on the transportation vehicle, a plurality of target trajectories of the transportation vehicle that connect the transportation vehicle starting point to the transportation vehicle target point; detecting a further target trajectory for each transportation vehicle other than the transportation vehicle that surrounds the transportation vehicle, wherein each of the further target trajectories for the surrounding other transportation vehicles connects the starting point of the respective surrounding other transportation vehicles to a target point corresponding to the respective surrounding other transportation vehicles, wherein the detection of the further target trajectories for each of the surrounding other transportation vehicles is performed based on data received from the surrounding other transportation vehicles via a radio communication device included in the transportation vehicle; determining, using the processor, which of the determined plurality of trajectories of the transportation vehicle are collision-free trajectories based on performing a determination that the trajectories of the transportation vehicle do not result in a collision with one of the surrounding other transportation vehicles should one of the surrounding other transportation vehicles move on the surrounding other transportation vehicle's determined target trajectory; determining, using the processor, one of the determined collision-free trajectories as a currently planned target trajectory of the transportation vehicle; thereafter, monitoring the currently planned target trajectory of the transportation vehicle to determine whether to re-determine the currently planned target trajectory of the transportation vehicle depending on the collision-free trajectories of the transportation vehicle; and re-determining the currently planned target trajectory based on the monitoring to determine a new currently planned target trajectory of the transportation vehicle depending on the collision-free trajectories of the transportation vehicle determined at that time: wherein a minimum and maximum for at least one property of points on the collision-free trajectories that lie within a respective grid cell of a grid map of a lane in which the transportation vehicle is traveling at a certain point in time are used to determine a degree of freedom for the respective cell, wherein the degree of freedom is based on a difference between a maximum and minimum speed in the respective grid cell, a difference between a maximum and minimum orientation within the respective grid cell, and a difference between the maximum and minimum time within the respective cell.

2. The method of claim 1, further comprising:
determining, by the processor on the transportation vehicle, an occupancy map that indicates whether one of the other surround transportation vehicles is in the respective grid cell; and
determining, by the processor, the collision-free trajectories depending on the occupancy map.

3. The method of claim 2, further comprising:
determining a state space, by the processor on the transportation vehicle, for the transportation vehicle based on determining the minimum and maximum for the at least one property based on the trajectories of the vehicle per grid cell of the grid map of the lane in which the vehicle is traveling for points of the trajectories that lie within the respective grid cell,
wherein the determination of the currently planned target trajectory of the transportation vehicle and the monitoring of the currently planned target trajectory to determine whether to re-determine the currently planned target trajectory of the transportation vehicle are performed based on the determined state space.

4. The method of claim 3, further comprising:
determining, by the processor of the transportation vehicle, a common state space for the transportation vehicle by combining the occupancy map and the state space for the vehicle,
wherein the minimum and the maximum for the at least one property of points on the collision-free trajectories that lie within the respective grid cell are determined based on the collision-free trajectories of the transportation vehicle per grid cell, and
wherein the determination of the currently planned target trajectory of the transportation vehicle and the monitoring of the currently planned target trajectory to determine whether to re-determine the currently planned target trajectory of the transportation vehicle are performed based on the determined state space.

5. The method of claim 1, further comprising determining, by the processor of the transportation vehicle, the minimum and maximum for the at least one property for points on the collision-free trajectories that lie within the respective grid cell based on the collision-free trajectories of the transportation vehicle for the grid cells of the grid map of the lane in which the transportation vehicle is traveling,
wherein the currently planned target trajectory of the transportation vehicle is determined and monitored to determine whether to re-determine the currently planned target trajectory of the transportation vehicle depending on the minimum and the maximum of the at least one property.

6. The method of claim 5, wherein the currently planned target trajectory of the transportation vehicle is determined and monitored to determine whether to re-determine the currently planned target trajectory of the transportation vehicle depending on the degree of freedom.

7. The method of claim 6, further comprising calculating the degree of freedom for at least one respective grid cell using the following Equation:

$$f_{c_{i,j}} = \alpha(\Delta V_{c_{i,j}}/v) + \beta(\Delta \Psi_{c_{i,j}}/\psi) + \gamma(\Delta T_{c_{i,j}}/t),$$

wherein $\alpha$, $\beta$ and $\gamma$ are constants,
wherein $\Delta V_{c_{i,j}}$ corresponds to a difference of the maximum speed and the minimum speed within the grid cell,
wherein $\Delta \Psi_{c_{i,j}}$ corresponds to a difference of the maximum orientation and the minimum orientation within the grid cell,
wherein $\Delta T_{c_{i,j}}$ corresponds to a difference between the maximum time and the minimum time within the cell,
and wherein v, $\psi$ and t are normalization functions.

8. The method of claim 6, wherein the degree of freedom is determined at a first point in time and at a later second point in time, and the currently planned target trajectory of the transportation vehicle is determined and/or monitored depending on a comparison between the degree of freedom that is determined at the second point in time and at least one threshold value that is determined depending on the degree of freedom that is determined at the first point in time.

9. The method of claim 1, further comprising:
predetermining the currently planned target trajectory for the transportation vehicle, and determining whether the predetermined currently planned target trajectory is maintained by the transportation vehicle depending on the determined collision-free trajectories to determine whether to re-determine the currently planned target trajectory for the transportation vehicle.

10. The method of claim 8, wherein
a first threshold value and a second threshold value that is smaller than the first threshold value are determined depending on the degree of freedom at the first point in time,
the currently planned target trajectory of the vehicle is determined as the target trajectory that was calculated at the first point in time in response to the degree of freedom calculated at the second point in time being greater than the first threshold value,
the currently planned target trajectory of the vehicle being re-determined in response to the degree of freedom calculated at the second point in time being smaller than the first threshold value but greater than the second threshold value, and
wherein the determination of the currently planned target trajectory and monitoring to determine whether to re-determine the currently planned target trajectory of the transportation vehicle are terminated in response to the degree of freedom calculated at the second point in time being smaller than the second threshold value.

11. The method of claim 7, wherein the degree of freedom is determined for at least one grid cell through which the target trajectory passes.

12. A device installed in a transportation vehicle for determining and, thereafter, monitoring a need to re-determine a current target trajectory of the transportation vehicle, wherein target trajectories connect a transportation vehicle starting point that corresponds to a current position of the transportation vehicle is connected to a target point for the transportation vehicle, the device comprising: a detector; and a processor, wherein the detector is configured to detect a target trajectory for each transportation vehicle other than the transportation vehicle that surrounds the transportation vehicle, wherein each of the further target trajectories for the surrounding other transportation vehicles connects the starting point of the respective surrounding other transportation vehicles to a target point corresponding to the respective surrounding other transportation vehicles, wherein the detection of the further target trajectories by the detector is performed based on data received from the surrounding other transportation vehicles via a radio communication device included in the transportation vehicle, wherein the processor is configured to determine a plurality of target trajectories of the transportation vehicle that connect the starting point to the target point and to determine which of those determined target trajectories of the transportation vehicle are collision-free trajectories that do not result in a collision with one of the surrounding other transportation vehicles, wherein the processor is further configured to determine, one of the determined collision-free trajectories as a currently planned target trajectory of the transportation vehicle, wherein thereafter, the processor and detector cooperate to monitor the currently planned target trajectory of the transportation vehicle to determine whether to re-determine the currently planned target trajectory of the transportation vehicle depending on the collision-free trajectories of the transportation vehicle, wherein the processor is further configured to re-determine the currently planned target trajectory based on the monitoring to determine a new currently planned target trajectory of the transportation vehicle depending on the collision-free trajectories of the transportation vehicle determined at that time, and wherein a minimum and maximum for at least one property of points on the collision-free trajectories that lie within a respective grid cell of a grid map of a lane in which the transportation vehicle is traveling at a certain point in time are used to determine a degree of freedom for the respective cell, wherein the degree of freedom is based on a difference between a maximum and minimum speed in the respective grid cell, a difference between a maximum and minimum orientation within the respective grid cell, and a difference between the maximum and minimum time within the respective cell.

13. The device of claim 12, wherein the processor and detector cooperate to determine an occupancy map that indicates whether one of the surrounding other transportation vehicles is in the respective grid cell, and determines the collision-free trajectories depending on the occupancy map.

14. The device of claim 13, wherein the processor determines a state space for the transportation vehicle based on determining the minimum and maximum based on the target trajectories of the transportation vehicle per grid cell of the grid map of the lane in which the transportation vehicle is traveling for at least one property of points of the target trajectories that lie within the respective grid cell, wherein the determination of the currently planned target trajectory of the transportation vehicle and the monitoring of the currently planned target trajectory to determine whether to re-determine the currently planned target trajectory of the transportation vehicle are performed based on the determined state space.

15. The device of claim 13, wherein the processor is further configured to determine the minimum and the maximum for the at least one property for points on the collision-free trajectories that lie within the respective grid cell based on the collision-free trajectories of the transportation vehicle for the grid cells of the grid map of the lane in which the vehicle is traveling, and wherein the currently planned target trajectory of the transportation vehicle is determined and monitored to determine whether to re-determine the currently planned target trajectory of the transportation vehicle depending on the minimum and the maximum of the at least one property.

16. The device of claim 12, wherein the processor predetermines the currently planned target trajectory for the transportation vehicle, and determines whether the predetermined target trajectory should be maintained depending on the determined collision-free trajectories of the transportation vehicle to determine whether to re-determine the currently planned target trajectory for the transportation vehicle.

17. A transportation vehicle with a device for determining and, thereafter, monitoring a need to re-determine a current target trajectory of the transportation vehicle, wherein target trajectories connect a transportation vehicle starting point that corresponds to a current position of the transportation vehicle is connected to a target point for the transportation vehicle, the device comprising: a detector; and a processor, wherein the detector is configured to detect a target trajectory for each transportation vehicle other than the transportation vehicle that surrounds the transportation vehicle, wherein each of the further target trajectories for the surrounding other transportation vehicles connects the starting point of the respective surrounding other transportation vehicles to a target point corresponding to the respective surrounding other transportation vehicles, wherein the detection of the further target trajectories by the detector is performed based on data received from the surrounding other transportation vehicles via a radio communication device included in the transportation vehicle, wherein the processor is configured to determine a plurality of target trajectories of the transportation vehicle that connect the starting point to the target point and to determine which of those determined target trajectories of the transportation vehicle are collision-free trajectories that do not result in a collision with one of the surrounding other transportation vehicles, wherein the processor is further configured to determine, one of the determined collision-free trajectories as a currently planned target trajectory of the transportation vehicle, wherein thereafter, the processor and detector cooperate to monitor the currently planned target trajectory of the transportation vehicle to determine whether to re-determine the currently planned target trajectory of the transportation vehicle depending on the collision-free trajectories of the transportation vehicle, wherein the processor is further configured to re-determine the currently planned target trajectory based on the monitoring to determine a new currently planned target trajectory of the transportation vehicle depending on the collision-free trajectories of the transportation vehicle determined at that time, and wherein a minimum and maximum for at least one property of points on the collision-free trajectories that lie within a respective grid cell of a grid map of a lane in which the transportation vehicle is traveling at a certain point in time are used to determine a degree of freedom for the respective cell, wherein the degree of freedom is based on a difference between a maximum and minimum speed in the respective grid cell, a difference between a maximum and minimum orientation within the respective grid cell, and a difference between the maximum and minimum time within the respective cell.

18. The transportation vehicle of claim 17, wherein the processor and detector cooperate to determine an occupancy map that indicates whether one of the surrounding other transportation vehicles is in the respective grid cell, and determines the collision-free trajectories depending on the occupancy map.

19. The transportation vehicle of claim 17, wherein the processor determines a state space, by the processor on the transportation vehicle, for the transportation vehicle based on determining the minimum and maximum for the at least one property based on the trajectories of the vehicle per grid cell of the grid map of the lane in which the vehicle is traveling of points of the trajectories that lie within the respective grid cell, wherein the determination of the currently planned target trajectory of the transportation vehicle and the monitoring of the currently planned target trajectory to determine whether to re-determine the currently planned target trajectory of the transportation vehicle are performed based on the determined state space.

20. The transportation vehicle of claim 19, wherein the processor determines the minimum and the maximum for the at least one property of points on the collision-free trajectories that lie within the respective grid cell based on the collision-free trajectories of the transportation vehicle for the grid cells of the grid map of the lane in which the transportation vehicle is traveling, wherein the determination of the target trajectory of the vehicle of the currently planned target trajectory of the transportation vehicle and, the monitoring of the currently planned target trajectory to determine whether to re-determine the currently planned target trajectory of the transportation vehicle are performed based on the determined state space.

21. The transportation vehicle of claim 17, wherein the device predetermines the currently planned target trajectory for the transportation vehicle, and determines whether to maintain the predetermined currently planned target trajectory by the transportation vehicle depending on the determined collision-free trajectories to determine whether to re-determine the currently planned target trajectory for the transportation vehicle.

\* \* \* \* \*